May 7, 1929.  J. B. STEVENS  1,711,756

WINDSHIELD WIPER

Filed Nov. 12, 1927

INVENTOR
J. B. Stevens
BY
ATTORNEY

Patented May 7, 1929.

1,711,756

UNITED STATES PATENT OFFICE.

JAMES B. STEVENS, OF MODESTO, CALIFORNIA.

WINDSHIELD WIPER.

Application filed November 12, 1927. Serial No. 232,799.

This invention relates to improvements in windshield wipers on automobiles of the closed body type and similar vehicles; my principal object being to provide an electrically actuated wiper which is adapted to be reciprocated from one side to the other of the wind shield instead of moving through a circular arc as is the case with the ordinary wiper. Since my improved wiper may extend for the full height of the wind shield the entire area thereof may thus be kept free of moisture instead of a comparatively small portion of such area as is the case with the ordinary wiper. As a result driving visibility is considerably improved, since the driver can properly see through the entire wind shield area and safety when driving in wet weather is therefore promoted.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
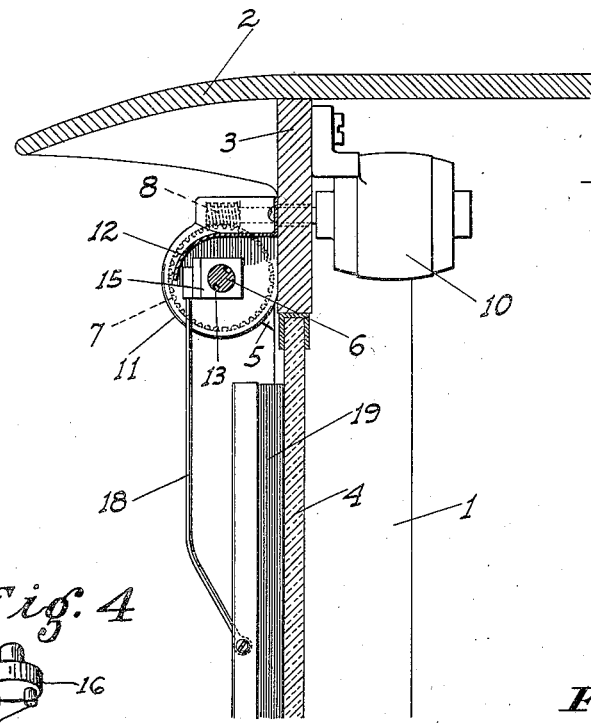
Fig. 1 is a fragmentary sectional elevation of the front upper end of a closed car body showing my improved wiper mounted in connection therewith.
Figure 4:
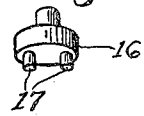
Fig. 4 is a perspective view of a pawl member.
Figure 2:
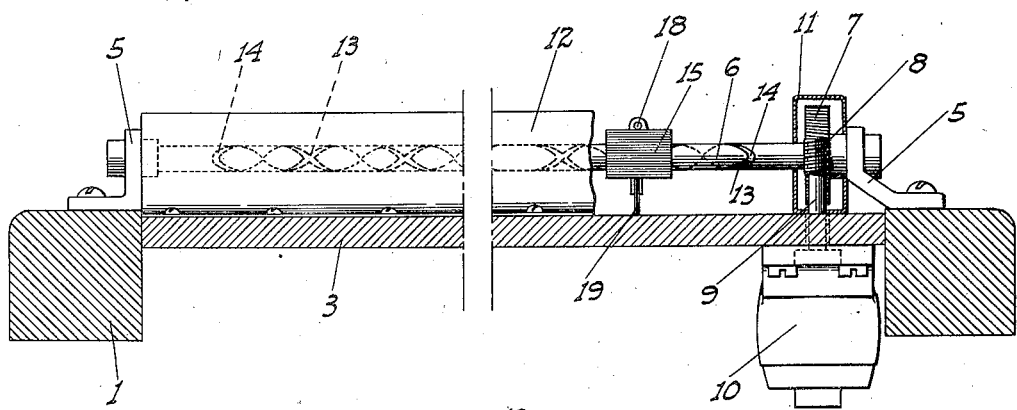
Fig. 2 is a plan view of the wiper structure as applied to a car, partly broken out.
Figure 3:
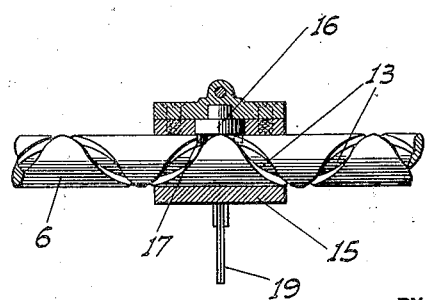
Fig. 3 is an enlarged fragment of the screw shaft, showing the sliding block and screw engaging pawl cooperating with said shaft.

Referring now more particularly to the numerals of reference on the drawings, the numeral 1 denotes the front posts of a motor vehicle between which posts and just under the roof 2 is a rigid transverse panel 3 below which the wind shield 4 depends. Such parts are standard in one form or another in all closed body vehicles and are shown to illustrate the manner in which my improved wiper is attached.

Fixed on the posts 1 above the wind shield and outside the car are opposed brackets 5 which turnably support the ends of a transverse shaft 6. At one end this shaft has a worm gear 7 engaged by a worm 8 which is mounted on the shaft 9 of an electric motor 10. This motor is mounted on the panel 3 inside the car, the panel being drilled to receive the shaft 9 therethrough. The current for the motor is of course taken from the ignition system of the vehicle. A housing 11 incloses the gear and a hood 12 overhangs and protects the shaft and extends the full length thereof between the brackets.

The shaft 6 has a pair of right and left hand steep-pitch grooves or threads 13 running substantially from end to end thereof, which threads across each other at intervals and at their ends are joined on to each other where they come together in the form of curved loops as at 14.

A block 15 is slidable along the shaft which block has a turnable head 16 mounted and inclosed therein. This head is disposed at right angles to the shaft and bears against the same, and has pawls 17 to engage the shaft grooves. The pawls are in the form of round pins, disposed in diametrally opposed relation to the axis of the head 16 and at equal radial distances from said axis. The block also forms the support for a depending rod 18 which supports a vertical wiper blade 19 of ordinary character which bears against the wind shield from adjacent the top thereof downwardly. The pawl member in the block is so arranged that with the rotation of the shaft in a single direction, the pawl will remain engaged with one groove from one end to the other thereof so that the block will be moved horizontally from one end of the shaft to the other; said pawl then swiveling around the adjacent end loop of the groove to engage the other groove. This other groove running in the opposite direction along the shaft of course causes the pawl and block to be likewise carried to the other end of the shaft and to swivel around the adjacent end loop and again engage the first groove, etc. Since the pawl-mounted block also carries the wiper blade, the reciprocation of the block back and forth will cause the said blade to be moved over practically the full width of the wind shield. The direction of rotation of the shaft is such as to impart a rotative pressure against the block in a direction which causes the wiper blade to bear firmly against the wind shield.

While I have particularly shown and described this device as being mounted on the wind shield of a motor vehicle, it will be evident that it may be also adapted for use in connection with the motorman's window, of a street car, as well as for the interior of store front or show windows and in any such structures which are apt to collect moisture and which should be kept clear of such moisture.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In windshield wiper construction, a horizontal driven shaft having a pair of opposed spiral grooves therein intersecting each other at intervals and connected to each other at their ends, a block surrounding the shaft and movable therealong, means for attaching a wiper element to the block, a member mounted in the block adjacent and tangent to the shaft and turnable in said block on an axis radial with the shaft, and pins projecting from the face of the member nearest the shaft and engaging a groove thereof at longitudinally spaced points therein; said pins being disposed on a line diametral with respect to the axis of the member and at points equidistant from said axis.

In testimony whereof I affix my signature.

JAMES B. STEVENS.